US012491941B2

(12) United States Patent
Abele et al.

(10) Patent No.: US 12,491,941 B2
(45) Date of Patent: Dec. 9, 2025

(54) STEERING SENSOR DEVICE COMPRISING A PLUG-IN/ROTATIVE CONNECTION

(71) Applicant: Robert Bosch GmbH, Stuttgart (DE)

(72) Inventors: Wolfgang Abele, Spraitbach (DE); Waldemar Mattus, Schwaebisch Gmuend (DE); Denis Amato, Heubach (DE)

(73) Assignee: Robert Bosch GmbH, Stuttgart (DE)

( * ) Notice: Subject to any disclaimer, the term of this patent is extended or adjusted under 35 U.S.C. 154(b) by 1520 days.

(21) Appl. No.: 16/963,164

(22) PCT Filed: Jan. 30, 2019

(86) PCT No.: PCT/EP2019/052186
§ 371 (c)(1),
(2) Date: Jul. 17, 2020

(87) PCT Pub. No.: WO2019/158360
PCT Pub. Date: Aug. 22, 2019

(65) Prior Publication Data
US 2021/0122417 A1 Apr. 29, 2021

(30) Foreign Application Priority Data
Feb. 15, 2018 (DE) ............ 10 2018 202 318.2

(51) Int. Cl.
*B62D 15/02* (2006.01)
*B60R 16/027* (2006.01)
*G01D 5/244* (2006.01)

(52) U.S. Cl.
CPC ........ *B62D 15/0215* (2013.01); *B60R 16/027* (2013.01); *G01D 5/24442* (2013.01)

(58) Field of Classification Search
CPC ........... B62D 15/0215; G01D 5/24442; G01D 5/142; G01D 5/145; G01D 5/147;
(Continued)

(56) References Cited

U.S. PATENT DOCUMENTS 8,813,578 B2 * 8/2014 Kaess ............... G01L 3/104
324/207.2
2008/0000715 A1 * 1/2008 Bouvier ............... H04R 1/345
181/156
(Continued)

FOREIGN PATENT DOCUMENTS

| CN | 102564297 A | 7/2012 |
| CN | 102735162 A | 10/2012 |

(Continued)

OTHER PUBLICATIONS

International Search Report corresponding to PCT Application No. PCT/EP2019/052186, mailed May 13, 2019 (German and English language document) (6 pages).

(Continued)

*Primary Examiner* — David M Schindler
(74) *Attorney, Agent, or Firm* — Maginot, Moore & Beck LLP

(57) ABSTRACT

A steering sensor device for detecting at least one piece of steering information, particularly at least one steering angle, includes at least one holding body which is connected to a steering shaft for rotation therewith, in a mounted state, and at least one toothed rim that includes at least one toothing for detecting the steering information. The holding body and the toothed rim can be interconnected, in the mounted state, by means of a plug-in/rotative connection.

14 Claims, 5 Drawing Sheets

(58) Field of Classification Search
CPC .......... G01D 5/16; G01D 5/165; G01D 5/244; G01D 5/24404; G01D 5/24409; G01D 5/24414; G01B 7/30
See application file for complete search history.

(56) References Cited

U.S. PATENT DOCUMENTS

| | | | |
|---|---|---|---|
| 2008/0238416 A1* | 10/2008 | Shiraga | B62D 15/0215 324/207.25 |
| 2009/0289623 A1 | 11/2009 | Sano | |
| 2012/0152034 A1 | 6/2012 | Kaess et al. | |
| 2012/0260510 A1 | 10/2012 | Lee | |
| 2015/0375787 A1 | 12/2015 | Adachi et al. | |
| 2021/0001789 A1* | 1/2021 | Utsunomiya | B60R 16/027 |

FOREIGN PATENT DOCUMENTS

| | | |
|---|---|---|
| CN | 104870958 A | 8/2015 |
| CN | 107521552 A | 12/2017 |
| DE | 101 45 030 A1 | 4/2003 |
| DE | 10 2004 023 801 A1 | 8/2005 |
| DE | 10 2012 024 383 A1 | 6/2014 |
| DE | 10 2016 107 916 A1 | 11/2017 |
| EP | 260 356 A2 | 12/2017 |
| JP | 2008-241388 A | 10/2008 |
| KR | 10-0868565 B1 * | 11/2008 |
| KR | 10-2011-0039875 A | 4/2011 |
| KR | 10-2013-0098691 A | 9/2013 |
| KR | 10-1326191 B1 | 10/2013 |
| KR | 10-1584612 B1 | 1/2016 |
| WO | 2017/186546 A1 | 11/2017 |

OTHER PUBLICATIONS

Reif, K.; "Sensoren im Kraftfahrzeug", 2. Aufl., SpringerVieweg, 2012, p. 140.

* cited by examiner

STEERING SENSOR DEVICE COMPRISING A PLUG-IN/ROTATIVE CONNECTION

This application is a 35 U.S.C. § 371 National Stage Application of PCT/EP2019/052186, filed on Jan. 30, 2019, which claims the benefit of priority to Serial No. DE 10 2018 202 318.2, filed on Feb. 15, 2018 in Germany, the disclosures of which are incorporated herein by reference in their entirety.

The disclosure is based on a steering sensor device.

The disclosure additionally relates to a steering sensor, to a steering system, as claimed in claim 12 and also to a method for assembling a steering sensor device as claimed in claim 13.

BACKGROUND

Steering systems for motor vehicles comprising steering sensors for determining a steering angle and/or a steering torque which is exerted on a steering shaft are known from the prior art, such as DE 10 2004 023 801 A1 and/or DE 10 2016 107 916 A1. Steering sensors of this kind generally comprise a rotation unit which is connected in a rotationally fixed manner to the steering shaft and a sensor housing which is mounted in a floating manner on the steering shaft and surrounds the rotation unit and is provided for mounting further sensor components. In this case, the steering angle is detected by means of a gear wheel mechanism which comprises a toothed ring which is fastened to a holding body of the rotation unit and a gear wheel which meshes with the toothed ring. In this case, the toothed ring can, in principle, be integrally formed with the holding body or advantageously can be formed separately from the holding body, as a result of which processing capability can be increased. However, fastening methods which have been known to date for fastening the toothed ring to the holding body have various disadvantages and lead, for example, to a complicated and time-consuming assembly process and/or to a reduction in stability and/or robustness of the steering sensor, and therefore an optimized connection between the holding body and the toothed ring is desirable.

The object of the disclosure is, in particular, to provide a steering sensor device which can be assembled advantageously in a simple and/or rapid manner and has improved properties in respect of stability. The object is achieved by the characterizing features described herein, while advantageous refinements and developments of the steering sensor device can be found in following description.

SUMMARY

The disclosure is based on a steering sensor device for detecting at least one item of steering information, in particular at least one steering angle, comprising at least one holding body which is connected in a rotationally fixed manner to a steering shaft in an assembled state, and comprising at least one toothed ring which has at least one toothing system, advantageously an external toothing system, for detecting the item of steering information.

The disclosure proposes that the holding body and the toothed ring are connected to one another by means of a plug-in/rotary connection in the assembled state, in particular in such a way that the holding body and the toothed ring are coupled to one another in a rotationally fixed manner. Owing to this refinement, in particular stability and/or robustness of the steering sensor device can be improved and at the same time an assembly process can be greatly simplified. In this context, in particular a required contact-pressure force, of at least 150 N for example, can be maintained with processing capability and a number of assembly combinations can be reduced. Furthermore, a service life and/or a durability of the steering sensor device can advantageously be improved, wherein it is advantageously possible to ensure that all of the forces acting on the steering sensor device over the service life of the steering sensor device can be absorbed. Furthermore, tilting of the holding body and of the toothed ring relative to one another can advantageously be avoided, as a result of which the development of noise during operation of the steering sensor device can be minimized.

In this context, a "steering sensor device" is intended to be understood to mean, in particular, at least a part, in particular a subassembly, of a steering sensor. In this case, the steering sensor could be designed, in particular, as a steering torque sensor or as a steering angle sensor. However, the steering sensor is advantageously designed as a combined steering torque and steering angle sensor. In this case, the steering sensor is particularly advantageously part of a steering system and in particular intended for use in a vehicle, preferably a motor vehicle. Furthermore, the steering sensor and/or the steering sensor device can comprise further components and/or assemblies, such as for example at least one sensor housing, in particular which surrounds the holding body and/or the toothed ring, and/or a sensor unit, in particular which is arranged in the sensor housing and is provided to interact with the toothed ring for detecting the item of steering information. To this end, the sensor unit comprises at least one sensor element, such as a Hall sensor and/or a magnetoresistive sensor for example, and at least one toothing system element, which is preferably designed as a gear wheel and meshes with the toothed ring, in particular the external toothing system of the toothed ring, in the assembled state and is designed in such a way that it transmits and/or passes on a rotational movement of the toothed ring, for example by means of a change in magnetic field, to the sensor element. In particular, "provided" is intended to be understood to mean specially designed and/or equipped. The statement that an object is provided for a specific function is in particular intended to be understood to mean that the object fulfills and/or executes this specific function in at least one application and/or operating state.

Furthermore, the holding body is advantageously connected to the steering shaft in the assembled state in such a way that the holding body engages around the steering shaft to at least a major extent and preferably completely. The holding body is additionally advantageously integrally formed and comprises in particular at least one holding section which is associated with the toothed ring and is provided in particular for holding the toothed ring, and at least one fastening section which is associated with the steering shaft and is provided in particular for fastening to the steering shaft. In this case, the holding section particularly preferably consists of a plastic and the fastening section particularly preferably consists of a metal. Furthermore, the toothed ring is advantageously integrally formed and preferably designed in an annular manner, in particular in the form of a ring. In this case, the toothed ring advantageously has a large number of toothing elements which are arranged in particular on an outer side of the toothed ring and form the external toothing system of the toothed ring. In this case, the expression "at least to a major extent" is intended to be understood to mean in particular at least 55%, advantageously at least 65%, preferably at least 75%, particularly preferably at least 85% and particularly advantageously at least 95%. Furthermore, "integrally" is intended to be understood to mean in particular at least cohesively connected and/or formed with one another. The cohesive connection can be established for example by an adhesive bonding process, an overmolding process, a welding process, a soldering process or some other process. However, "integrally" is advantageously intended to be understood to mean formed from one piece and/or in one piece. This one piece is preferably produced from a single blank, a compound and/or a casting, such for example in an extrusion process and/or an injection-molding process. Furthermore, a "plug-in/rotary connection" is intended to be understood to mean in particular a connecting method which is advantageously different from a screw connection and comprises a translatory and/or a rotational movement component. In this case, the objects to be connected are advantageously moved toward one another with a translatory movement, in particular in an insertion direction, in a first step, as a result of which in particular a prespecified overlap between the objects is achieved, and rotated relative to one another by a rotational movement in a second step. The holding body and the toothed ring are preferably intended to be rotated relative to one another through an angle of at least 50° and preferably of at least 60° and/or by at most 100° and preferably by at most 80° in order to form the plug-in/rotary connection. In this case, only the toothed ring is particularly preferably moved and/or rotated relative to the holding body in order to form the plug-in/rotary connection.

In this context, the disclosure advantageously proposes that the holding body comprises at least one guide element which is arranged on an outer side and/or on a side which is averted from the steering shaft, advantageously a guide web, and the toothed ring comprises at least one further guide element which corresponds to the guide element and is arranged on an inner side and/or on a side which is averted from the toothing system, advantageously a guide groove, which guide element and further guide element engage one in the other, in particular in an interlocking and/or force-fitting manner, in the assembled state in order to form the plug-in/rotary connection. The holding body preferably has a plurality of, in particular at least two or at least three, guide elements which are arranged in particular on the holding section of the holding body and are arranged in a manner distributed over the outer side of the holding body. In this case, the toothed ring additionally advantageously has a plurality of, in particular at least two or at least three, further guide elements which are arranged in a manner distributed over the inner side of the toothed ring. As a result, a structurally particularly simple refinement of the plug-in/rotary connection can be realized in particular.

The disclosure further proposes that the guide element and/or the further guide element extend/extends at least partially in a circumferential direction of the holding body and/or of the toothed ring and in so doing is at a minimum angle of between 2° and 60°, preferably of between 3° and 40° and particularly preferably of between 4° and 20°, in relation to a plane which is oriented perpendicularly in relation to an axial direction which is defined by the steering shaft. In this case, the guide element and/or the further guide element in particular have an oblique profile, in particular which differs from a horizontal or vertical profile, in the circumferential direction of the holding body and/or of the toothed ring. As a result, a particularly simple and/or a particularly robust connection between the holding body and the toothed ring can be achieved in particular.

In the assembled state, the holding body and the toothed ring could be connected to one another for example by means of a plug-in/rotary connection which is designed as a bayonet fitting, in which at least one guide element of the holding body and/or of the toothed ring is designed in the form of a pin and at least one further guide element of the holding body and/or of the toothed ring is designed as an L-shaped guide groove which corresponds to said pin. However, a preferred refinement proposes that the guide element extends over at least 10%, preferably over at least 15% and particularly preferably over at least 20% and/or over at most 80%, preferably at most over 50% and particularly preferably over at most 30%, of a total outer circumference of the holding body and/or the further guide element extends over at least 10%, preferably over at least 15% and particularly preferably over at least 20% and/or over at most 80%, preferably over at most 50% and particularly preferably over at most 30%, of a total inner circumference of the toothed ring. As a result, an advantageously high contact-pressure force can be achieved and a service life and/or durability of the steering sensor device can be further increased in particular.

Furthermore, the disclosure proposes that the steering sensor device has a locking unit which is provided to lock the holding body and the toothed ring to one another in at least one locking position and in particular to connect said holding body and toothed ring to one another in such a way that releasing of the plug-in/rotary connection by a pure rotational movement is prevented. In this case, the locking unit can be designed, for example, as a clamp-type unit and/or a screw-type unit. However, the locking unit is advantageously designed as a latching unit and particularly preferably provided to automatically lock the holding body and the toothed ring in the locking position. As a result, a particularly high degree of operational reliability can be achieved in particular, wherein unintentional releasing of the connection between the holding body and the toothed ring can advantageously be prevented.

The locking unit could be designed for example separately from the holding body, the toothed ring, the sensor unit, the sensor housing and/or the steering shaft and/or could be fastened to precisely one of said components. However, the disclosure advantageously proposes that the locking unit comprises at least one locking element which is arranged on the holding body, preferably a latching element, and at least one further locking element which is arranged on the toothed ring and in particular corresponds to the locking element, preferably a further latching element. In this case, the locking element is preferably designed as a latching recess and extends in the axial direction which is defined by the steering shaft, specifically preferably over at least 5% and particularly preferably over at least 10% of a total extent of the holding body in the axial direction which is defined by the steering shaft. Furthermore, the further locking element is preferably designed as a latching arm and/or latching hook and extends over at least 5%, preferably over at least 10% and particularly preferably over at least 15%, of a total inner circumference of the toothed ring. As a result, advantageously simple and/or rapid locking can be achieved in particular.

A particularly robust locking unit and/or steering sensor device can be provided in particular when the locking element is integrally formed with the holding body and/or the further locking element is integrally formed with the toothed ring.

In a further advantageous refinement, the disclosure proposes that the further locking element is arranged on a side of the toothed ring that faces the holding body as seen in the insertion direction of the toothed ring. As a result, stability can be increased and/or damage to the further locking element during assembly can be avoided in particular.

A particularly high contact-pressure force can be achieved in particular when the locking position is arranged offset by at least 50° and preferably by at least 60° and/or by at most 100° and preferably by at most 80° in the circumferential direction of the holding body and/or of the toothed ring in relation to an insertion position for connecting the holding body and the toothed ring.

If the holding body, and/or the toothed ring have/has at least one fitting marking, for example in the form of a pictogram, which defines an orientation of the holding body and of the toothed ring relative to one another during assembly, particularly simple assembly can be achieved in particular.

Furthermore, the disclosure proposes a steering system comprising the steering shaft and comprising at least one steering sensor which is operatively connected to the steering shaft and comprises the abovementioned steering sensor device, wherein the holding body is connected in a rotationally fixed manner to the steering shaft in particular. Furthermore, the steering system can comprise further components and/or assemblies, such as for example a steering mechanism comprising at least one steering system actuating element, which is advantageously designed as a toothed rack, and/or a steering handle which is connected to the steering system actuating element by means of the steering shaft in particular. As a result, the advantages already mentioned above can be achieved in particular. In this case, in particular stability and/or robustness of the steering sensor device can be improved and at the same time an assembly process can be greatly simplified.

The disclosure additionally proposes a method for assembling the abovementioned steering sensor device, in which method the holding body and the toothed ring are connected to one another by means of a plug-in/rotary connection. In this case, preferably, the holding body and the toothed ring are oriented relative to one another in a first assembly step, advantageously with reference to the at least one fitting marking, moved toward one another with a translatory movement in a second assembly step and rotated relative to one another through an angle of at least 50° and preferably of at least 60° and/or through at most 100° and preferably through at most 80° by a rotational movement in a third assembly step. Particularly preferably, only the toothed ring is moved and rotated relative to the holding body in order to form the plug-in/rotary connection. As a result, the advantages already mentioned above can be achieved in particular. In this case, in particular stability and/or robustness of the steering sensor device can be improved and at the same time an assembly process can be greatly simplified.

The steering sensor device, the steering system and the method for assembling the steering sensor device are not intended to be limited to the above-described application and embodiment here. In particular, the steering sensor device, the steering system and the method for assembling the steering sensor device can have a number of individual elements, components and units which differs from a number mentioned in this document in order to fulfill a functionality described in this document.

BRIEF DESCRIPTION OF THE DRAWINGS

Further advantages can be found in the following description of the drawing. An exemplary embodiment is illustrated in the drawings. The drawings, the description and the claims contain numerous features in combination. A person skilled in the art will expediently also consider the features individually and combine them to form appropriate further combinations.

In the drawings.

DETAILED DESCRIPTION

Figure 1:
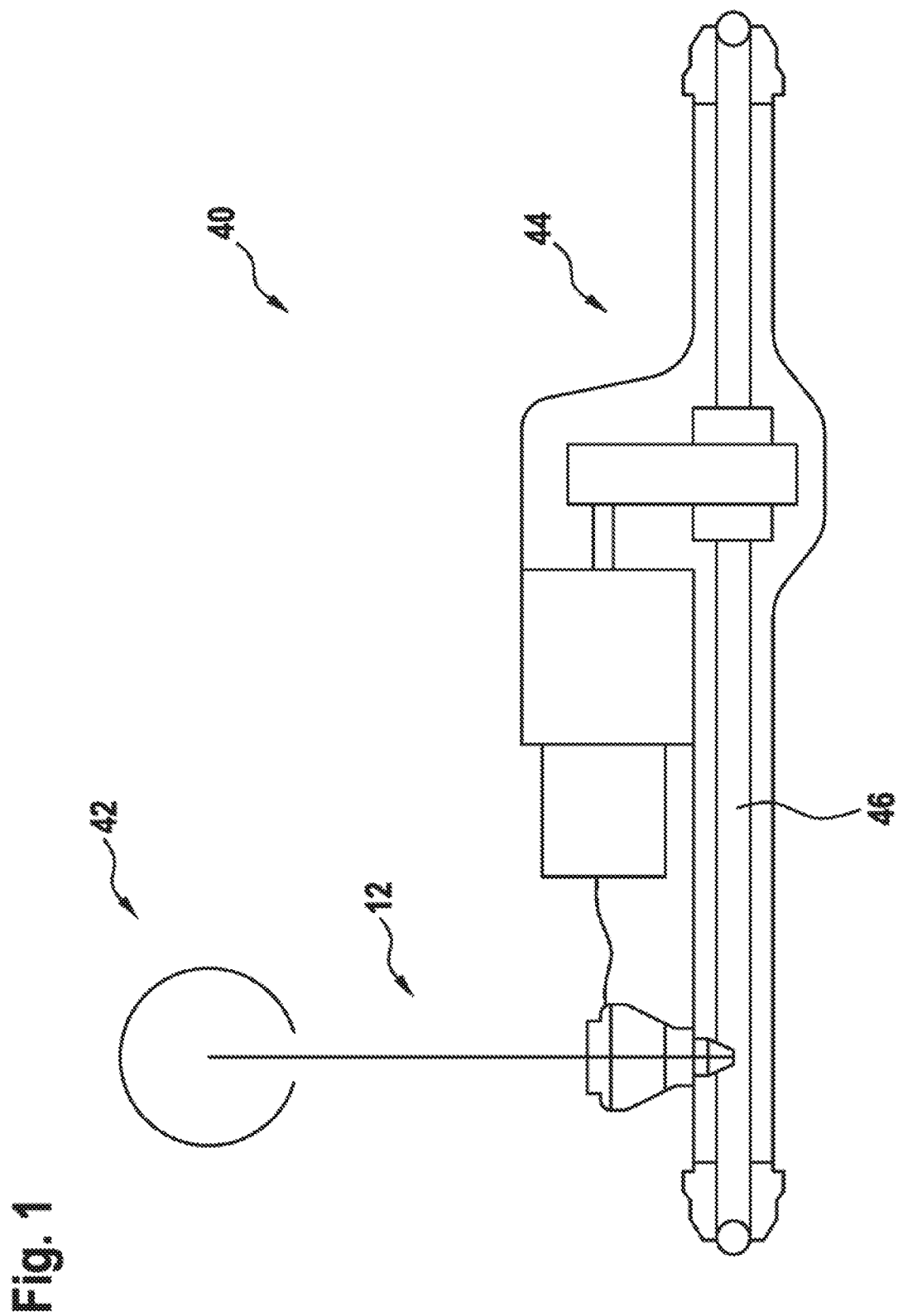
FIG. 1 shows a schematic illustration of an exemplary steering system with a steering sensor comprising a steering sensor device.

FIG. 1 shows a schematic illustration of a purely exemplary steering system 40. The steering system 40 is designed as an electrically assisted steering system and accordingly has electrical auxiliary force assistance. Furthermore, the steering system 40 is intended for use in a vehicle (not illustrated), in particular a motor vehicle. In an installed state, the steering system 40 is operatively connected to the vehicle wheels of the vehicle and is provided for influencing a direction of travel of the vehicle.

The steering system 40 comprises a steering handle 42, in the present case designed as a steering wheel by way of example, for applying a manual steering torque and a steering mechanism 44 which is known per se, has a steering system actuating element 46 and is provided to convert a steering prespecification on the steering handle 42 into a steering movement of the vehicle wheels.

Figure 2:
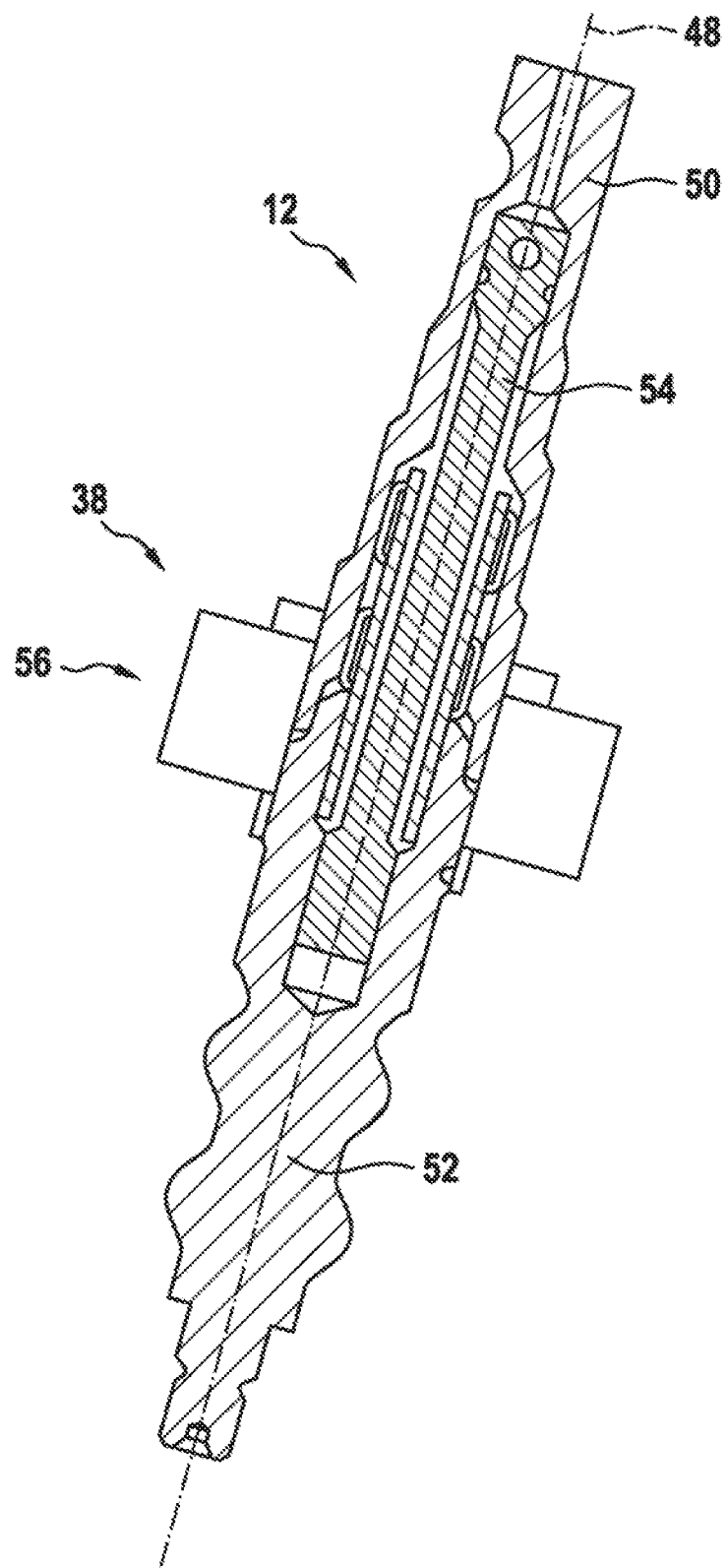
FIG. 2 shows a schematic sectional view through a steering shaft of the steering system and the steering sensor with the steering sensor device.

Furthermore, the steering system 40 comprises a steering shaft 12 which is known per se (also cf. FIG. 2). The steering shaft 12 is mounted such that it can rotate about a steering axis 48. The steering shaft 12 connects the steering handle 42 to the steering mechanism 44. Furthermore, the steering shaft 12 is of multipartite construction. The steering shaft 12 comprises an input shaft 50 which is associated with the steering handle 42. The input shaft 50 is designed as a steering spindle. The input shaft 50 can be rotated about the steering axis 48 depending on operation of the steering handle 42. In addition, the steering shaft 12 has an output shaft 52 which is associated with the steering mechanism 44. The output shaft 52 is designed as a steering pinion. The output shaft 52 is designed separately from the input shaft 50 and can rotate about the steering axis 48 relative to the input shaft 50. The output shaft 52 is provided to pass on a rotation of the input shaft 50 to the steering mechanism 44. In order to connect the input shaft 50 and the output shaft 52, the steering shaft 12 further has a torsion element 54. In the present case, the torsion element 54 is designed as a torsion bar and is arranged at least for the most part in a receiving region of the input shaft 50.

Figure 3:
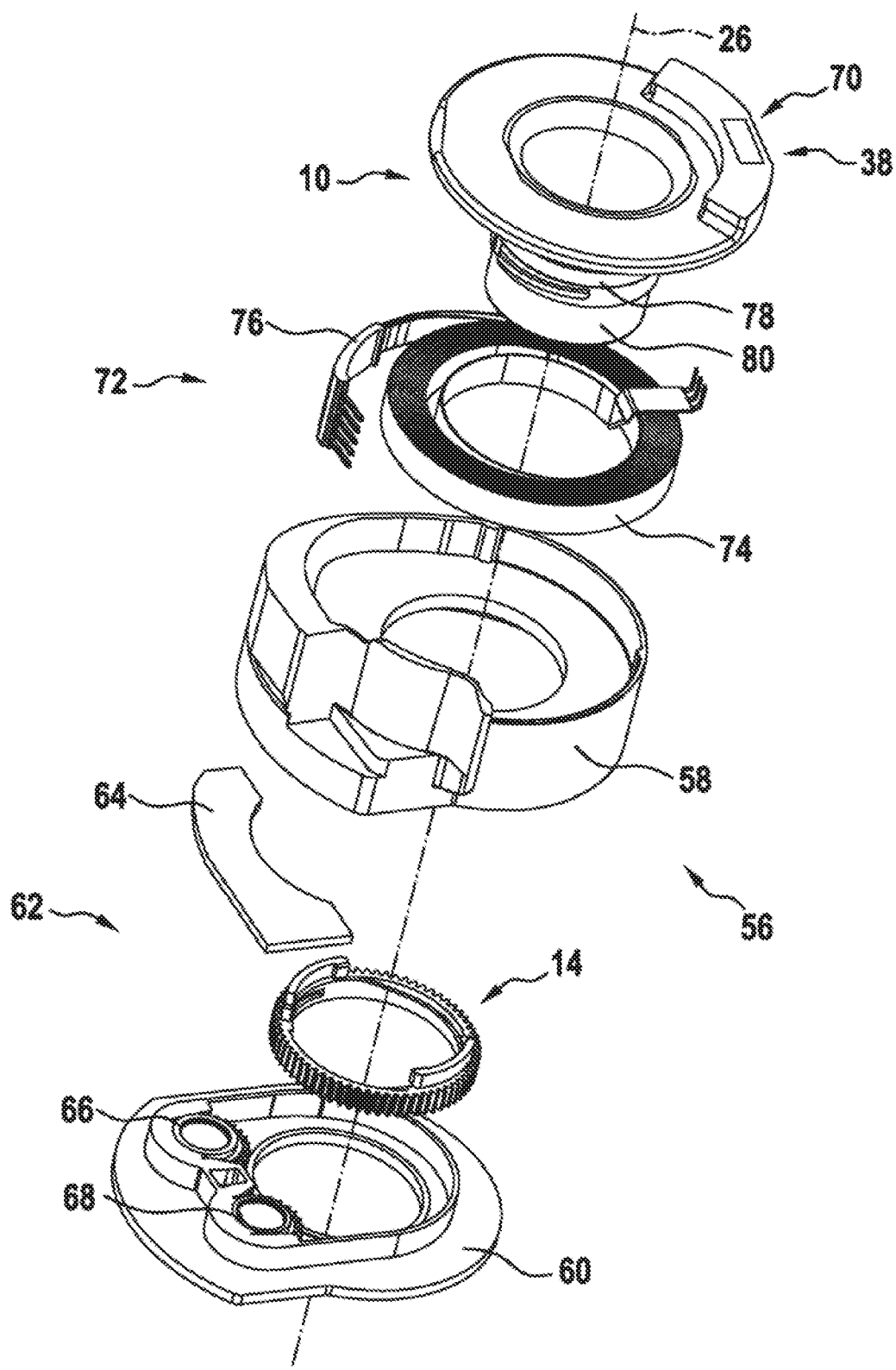
FIG. 3 shows an exploded illustration of the steering sensor with the steering sensor device.

Furthermore, the steering system 40 comprises a steering sensor 38 (also cf. FIG. 3) The steering sensor 38 is designed as a combined steering torque and steering angle sensor. The steering sensor 38 is arranged on the steering shaft 12 and engages around the steering shaft in the circumferential direction. In addition, the steering sensor 38 comprises a steering sensor device. However, in principle, it is also conceivable to design a steering sensor as a pure steering torque sensor or steering angle sensor.

The steering sensor device comprises a sensor housing 56 which is designed as an external housing. The sensor housing 56 is mounted in a floating manner on the steering shaft 12. The sensor housing 56 is of multipartite design and, in the present case, has a housing main body 58 and a housing cover 60. The sensor housing 56 is provided to receive and/or to mount at least a majority of the components required for operating the steering sensor 38.

The steering sensor device further has a holding body 10. In an assembled state, the holding body 10 is arranged on the steering shaft 12 and engages around the steering shaft 12 in the circumferential direction. In this case, the sensor housing 56 engages around at least a majority of the holding body 10. The holding body 10 is additionally integrally formed. In the assembled state, the holding body 10 is connected in a rotationally fixed manner to the steering shaft 12, in the present case in particular the output shaft 52. The holding body 10 comprises a holding section 78, which consists of plastic in particular, and a fastening section 80, which in particular consists of a metal and is provided for fastening to the steering shaft 12. In this case, during production, the fastening section 80 is encapsulated by injection molding with the holding section 78 in an injection-molding process. However, as an alternative, a holding section could also consist of a material which differs from plastic, such as for example a metal and/or a composite material or the like, and/or a fastening section could also consist of a material which differs from metal, such as for example a plastic and/or a composite material or the like.

Furthermore, the steering sensor device comprises a toothed ring 14. The toothed ring 14 is designed in an annular manner, in particular in the form of a ring. The toothed ring 14 is integrally formed. In the present case, the toothed ring 14 consists of plastic. In an assembled state, the toothed ring 14 is arranged on the steering shaft 12 and engages around the steering shaft and also the holding body 10 in the circumferential direction. In this case, the toothed ring 14 is connected in a rotationally fixed manner to the holding body 10. The sensor housing 56 additionally engages around the toothed ring 14. The toothed ring 14 is provided to contribute to detecting at least one item of steering information, in the present case in particular a steering angle. To this end, the toothed ring 14 has a toothing system 16, in particular which is designed as an external toothing system. However, as an alternative, a toothed ring could also consist at least partially of a material which differs from plastic, such as for example a metal and/or a composite material.

The steering sensor device further has a first sensor unit 62. The first sensor unit 62 is mounted in the sensor housing 56. The first sensor unit 62 is provided for detecting the item of steering information, in the present case in particular the steering angle. To this end, the first sensor unit 62 comprises at least one sensor element 64, such as for example a Hall sensor and/or a magnetoresistive sensor, and at least one toothing element 66, 68 which interacts with the sensor element 64. In the present case, the first sensor unit 62 has, by way of example, two toothing elements 66, 68, in particular which are designed as gear wheels, with a different number of toothing elements. In the assembled state, the toothing elements 66, 68 mesh with the toothed ring 14, in particular the toothing system 16 of the toothed ring 14. In this case, the toothing elements 66, 68 are designed in such a way that they transmit and/or pass on a rotational movement of the toothed ring 14, for example by means of a change in magnetic field, to the sensor element 64.

In addition, the steering sensor device has a second sensor unit 70. The second sensor unit 70 is arranged on, in particular fastened to, the holding body 10. Consequently, the second sensor unit 70 is connected in a rotationally fixed manner to the steering shaft 12. The second sensor unit 70 is provided for detecting at least one further item of steering information, in the present case in particular a steering torque.

Furthermore, the steering sensor device has a connecting unit 72. The connecting unit 72 serves for making electrical contact with the second sensor unit 70. In the present case, the connecting unit 72 is of multipartite design and comprises at least one flexible connecting element 74, in particular a helical spring, and at least one further connecting element 76 which interacts with the flexible connecting element 74, in particular a leadframe.

Figure 4:
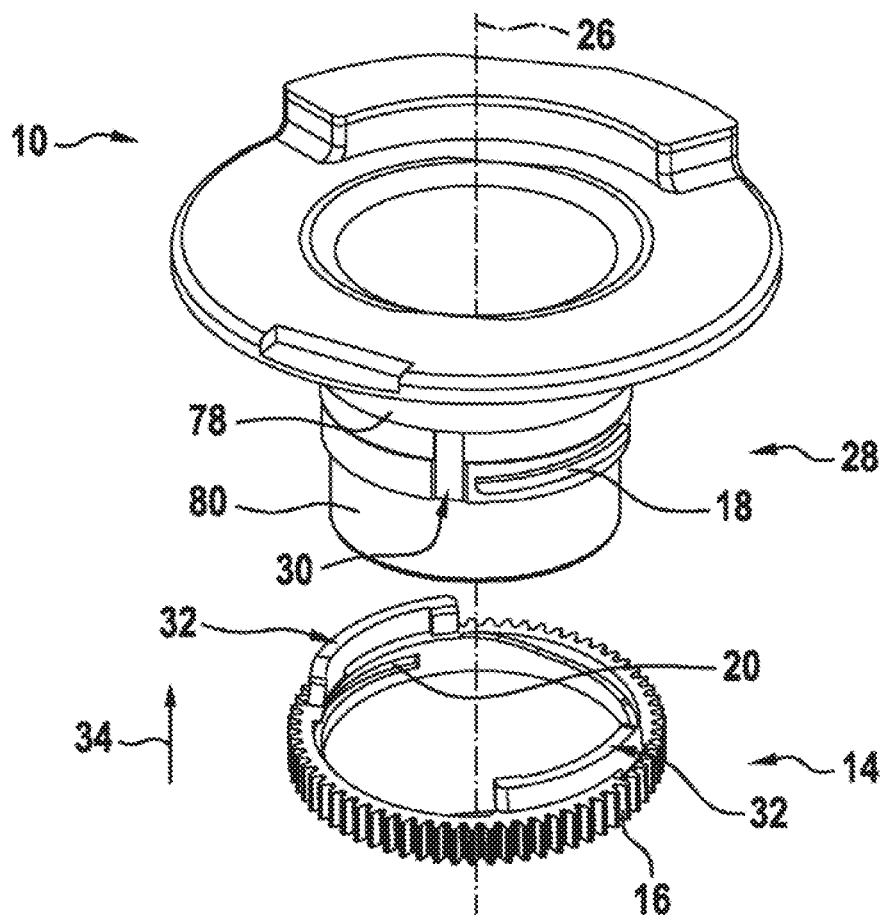
FIG. 4 shows an exploded illustration of a holding body and a toothed ring of the steering sensor device.

A connecting method for connecting the holding body 10 and the toothed ring 14 will now be explained with reference to FIG. 4.

In the present case, the holding body 10 and the toothed ring 14 are connected to one another by means of a plug-in/rotary connection in the assembled state. To this end, the holding body 10 has at least one guide element 18 which is arranged on an outer side and/or on a side which is averted from the steering shaft 12, and the toothed ring 14 has at least one further guide element 20 which corresponds to the guide element 18 and is arranged on an inner side and/or on a side which is averted from the toothing system 16.

In the present case, the holding body 10 comprises at least two guide elements 18 which are arranged in a manner distributed over the outer side of the holding body 10, and the toothed ring 14 has at least two corresponding further guide elements 20 which are arranged in a manner distributed over the inner side of the toothed ring 14. However, in principle, a holding body and/or a toothed ring could also have a different number of guide elements, such as for example precisely one guide element or at least three guide elements.

The guide elements 18 are identical to one another. In addition, the further guide elements 20 are identical to one another. Consequently, the following description is limited to only one of the guide elements 18 and one of the further guide elements 20, where the description can in principle also apply to the other guide element 18 and also the other further guide element 20.

In the present case, the guide element 18 is designed as a guide web. The guide element 18 is arranged, in particular integrally formed, on the holding section 78 of the holding body 10. The guide element 18 extends over at least 20% and over at most 30% of a total outer circumference of the holding body 10. In addition, the guide element 18 has an oblique profile in the circumferential direction of the holding body 10. In this case, the guide element 18 extends at least partially in a circumferential direction of the holding body 10 and is at a minimum angle of between 4° and 10° in relation to a plane which is oriented perpendicularly in relation to an axial direction 26 which is defined by the steering shaft 12. In the present case, the minimum angle is preferably 5°.

In the present case, the further guide element 20 is designed as a guide groove. The further guide element 20 extends over at least 20% and over at most 30% of a total inner circumference of the toothed ring 14. In addition, the further guide element 20 has an oblique profile in the circumferential direction of the toothed ring 14. In this case, the further guide element 20 extends at least partially in a circumferential direction of the toothed ring 14 and is at a minimum angle of between 4° and 10° in relation to a plane which is oriented perpendicularly in relation to the axial direction 26 which is defined by the steering shaft 12. The minimum angle is preferably 5°.

In order to form the plug-in/rotary connection, the holding body 10 and the toothed ring 14 are intended to be rotated about an angle of at least 60° and at most 80° relative to one another. In the assembled state, the guide element 18 and the further guide element 20 engage one in the other in an interlocking and/or force-fitting manner in order to form the plug-in/rotary connection. However, as an alternative, a guide element of a holding body can also be designed as a guide pin or guide groove. Furthermore, a further guide element of a toothed ring could be designed as a guide web or guide pin. Furthermore, a holding body and/or a toothed ring could in principle also have at least one guide element which is designed as a guide groove and at least one guide element which is designed as a guide web or guide pin.

In order to lock the holding body 10 and the toothed ring in the assembled state, the steering sensor device further comprises a locking unit 28. In the present case, the locking unit 28 is designed as a latching unit. The locking unit 28 is provided to lock the holding body 10 and the toothed ring 14 to one another in a locking position and in the process to connect said holding body and toothed ring to one another in such a way that releasing of the plug-in/rotary connection by a pure rotational movement is prevented. In this case, the locking position is arranged offset by at least 60° and at most 80° in the circumferential direction of the holding body 10 and/or of the toothed ring 14 in relation to an insertion position for connecting the holding body and the toothed ring 14. In the present case, the locking unit 28 is provided for automatically locking the holding body 10 and the toothed ring 14 in the locking position. To this end, the locking unit 28 comprises at least one locking element 30 which is arranged on the holding body 10 and at least one further locking element 32 which is arranged on the toothed ring 14 and corresponds to the locking element 30.

In the present case, the locking unit 28 comprises at least two locking elements 30 which are arranged on the holding body 10 and are arranged in a manner distributed over the holding body 10, and at least two corresponding further locking elements 32 which are arranged on the toothed ring 14 and are arranged in a manner distributed over the toothed ring 14. However, in principle, a locking unit could also have a different number of locking elements and/or further locking elements, such as for example precisely one locking element and/or further locking element or at least three locking elements and/or further locking elements.

The locking elements 30 are identical to one another. In addition, the further locking elements 32 are identical to one another. Consequently, the following description is limited to only one of the locking elements 30 and one of the further locking elements 32, where the description can in principle also apply to the other locking element 30 and also the other further locking element 32.

The locking element 30 is integrally formed with the holding body. The locking element 30 is arranged, in particular integrally formed, on the holding section 78 of the holding body 10 In the present case, the locking element 30 is designed as a latching element, in particular as a latching recess. The locking element 30 extends in the axial direction 26 which is defined by the steering shaft 12, specifically over at least 5% of a total extent of the holding body 10 in the axial direction 26 which is defined by the steering shaft 12.

The further locking element 32 is integrally formed with the toothed ring 14. In this case, the further locking element 32 is arranged on a side of the toothed ring 14 that faces the holding body 10 as seen in the insertion direction 34 of the toothed ring 14. In the present case, the further locking element 32 is designed as a latching element, in particular as a latching arm and/or a latching hook. The further locking element 32 extends over at least 15% of a total inner circumference of the toothed ring 14. The further locking element 32 is arranged on the toothed ring 14 in such a way that it is deflected elastically in a radial direction with respect to the steering shaft 12 during assembly. In this case, the further locking element 32 is provided for locking with the locking element 30 in the radial direction with respect to the steering shaft 12. However, as an alternative, a locking element and/or a further locking element could also be formed separately from a holding body and/or a toothed ring. In addition, a locking element of a holding body could be designed as a latching arm or as a locking element which differs from a latching element. Furthermore, a further locking element of a toothed ring could be designed as a latching recess or as a locking element which differs from a latching element. Furthermore, a further locking element could in principle also be arranged on a side of the toothed ring that is averted from a holding body as seen in the insertion direction of a toothed ring.

Figure 5:
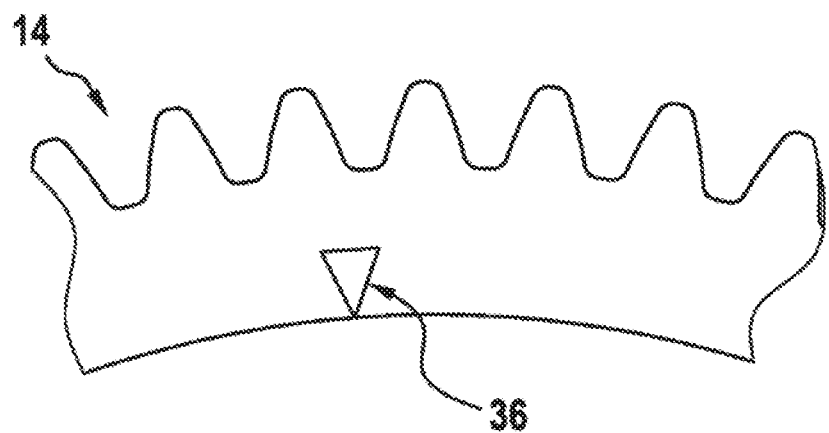
FIG. 5 shows an illustration of a detail of a fitting marking of the toothed ring.
Figure 6A:
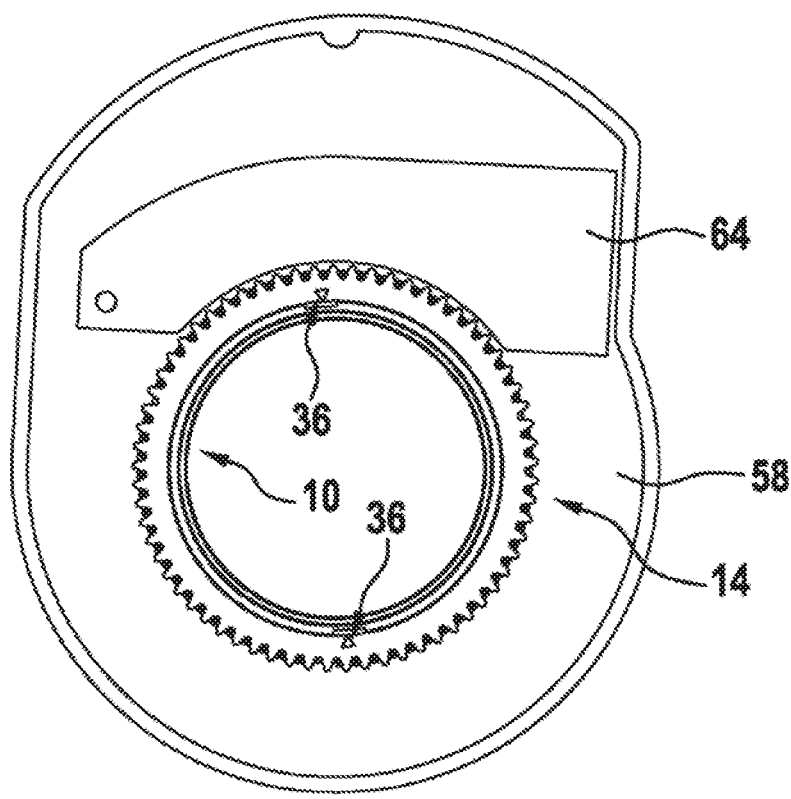
FIGS. 6a-b show an exemplary method for assembling the steering sensor device.

In order to simplify fitting of the toothed ring 14 onto the holding body 10, at least the toothed ring 14 further has at least one fitting marking 36 (cf. in particular FIGS. 5 and 6a). The fitting marking 36 is designed as a pictogram, in the present case as a triangle or arrow by way of example. The fitting marking 36 is arranged on a side of the toothed ring 14 that is averted from the holding body 10 as seen in the insertion direction 34 of the toothed ring 14. The fitting marking 36 defines an orientation of the holding body 10 and of the toothed ring 14 relative to one another during assembly. As an alternative or in addition, it is conceivable for a holding body to have a fitting marking. In addition, a fitting marking could also be entirely dispensed with in principle.

Figure 6B:
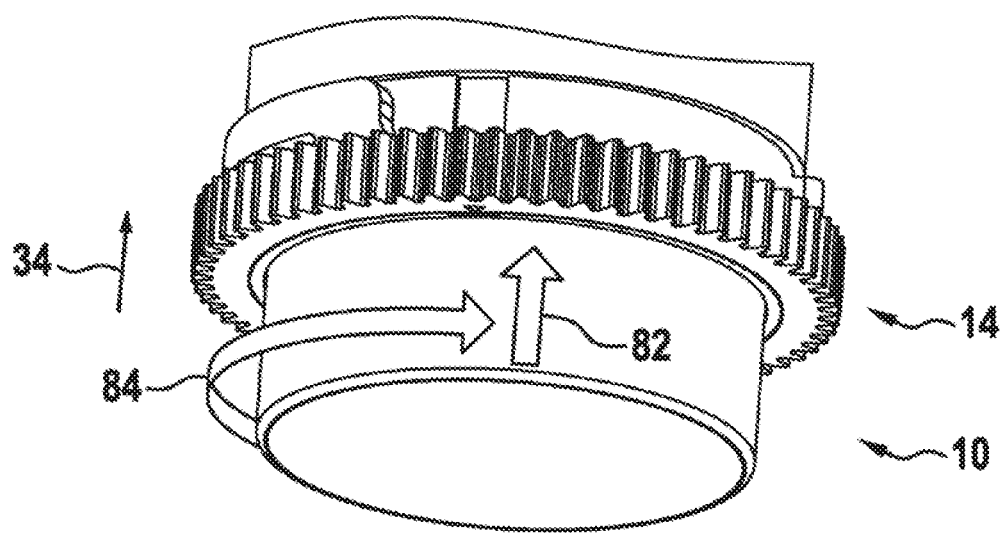

An exemplary method for assembling the steering sensor device will be described below with reference to FIGS. 6a and 6b, in which method the holding body 10 and the toothed ring 14 are connected to one another by means of a plug-in/rotary connection. In this case, the holding body 10 advantageously already forms a preassembled subassembly together with the housing main body 58, the sensor element 64 and the connecting unit 72. In the present method for assembling the steering sensor device, only the toothed ring 14 is moved and rotated relative to the holding body 10 in order to form the plug-in/rotary connection in the process. However, in principle, only a holding body could be moved and rotated relative to a toothed ring. Furthermore, both the holding body and also the toothed ring could be moved and/or rotated relative to one another.

In a first assembly step (cf. FIG. 6a), the toothed ring 14 is oriented relative to the holding body 10 using the at least one fitting marking 36. In the present case, the fitting marking 36 is oriented using the locking element 30, in particular the latching recess, in so doing.

In a second assembly step (cf. FIG. 6b), the toothed ring 14 is moved toward the holding body 10 in the insertion direction 34 with a translatory movement 82, in particular in such a way that a prespecified overlap between the toothed ring 14 and the holding body 10 is achieved.

In a third assembly step (cf. FIG. 6b), the toothed ring 14 is rotated relative to the holding body 10 by a rotational movement 84, as a result of which the guide elements 18 and the further guide elements 20 engage one into the other in particular in an interlocking and/or force-fitting manner. In the present case, the toothed ring 14 is rotated from an insertion position as far as a locking position, in particular through an angle of at least 60° and at most 80° relative to the holding body 10, in so doing, wherein the holding body 10 and the toothed ring 14 are automatically locked by means of the locking unit 28 in the locking position, in particular in such a way that releasing of the plug-in/rotary connection by a pure rotational movement is prevented.

Owing to this configuration, in particular stability and/or robustness of the steering sensor device can be improved and an advantageously uncomplicated assembly process can be achieved at the same time.

The invention claimed is:

1. A steering sensor device for detecting at least one item of steering information, comprising:
   a holding body configured to be connected in a rotationally fixed manner to a steering shaft; and
   a toothed ring which has a toothing system configured to be used in the detection of the at least one item of steering information,
   wherein the holding body and the toothed ring are configured to be mechanically connected to one another by (i) relative movement of the holding body with respect to the toothed ring in an insertion direction to provide a prespecified overlap between the holding body and the toothed ring at an insertion position, followed by (ii) relative rotation of the holding body with respect to the toothed ring about the insertion direction.

2. The steering sensor device as claimed in claim 1, wherein:
   the holding body comprises a guide element arranged on an outer side, and
   the toothed ring comprises a further guide element which corresponds to the guide element and is arranged on an inner side, the guide element and the further guide element configured to be engaged one in the other when the holding body and the toothed ring are mechanically connected.

3. The steering sensor device as claimed in claim 2, wherein:
   at least one of the guide element and the further guide element extends at least partially in a circumferential direction around the holding body and the toothed ring, respectively; and
   the at least one of the guide element and the further guide element extends at a minimum angle of between 2° and 60° in relation to a plane which is oriented perpendicularly to the insertion direction.

4. The steering sensor device as claimed in claim 2, wherein the guide element extends over at least 10% of a total outer circumference of the holding body and/or the further guide element extends over at least 10% of a total inner circumference of the toothed ring.

5. The steering sensor device as claimed in claim 1, further comprising:
   a locking unit configured to lock the holding body and the toothed ring to one another in at least one locking position.

6. The steering sensor device as claimed in claim 5, wherein the locking unit comprises at least one locking element arranged on the holding body and at least one further locking element arranged on the toothed ring.

7. The steering sensor device as claimed in claim 6, wherein the at least one locking element is integrally formed with the holding body and/or the at least one further locking element is integrally formed with the toothed ring.

8. The steering sensor device as claimed in claim 6, wherein the at least one further locking element is arranged on a side of the toothed ring that faces the holding body as seen in the insertion direction of the toothed ring.

9. The steering sensor device as claimed in claim 6, wherein the at least one locking position is arranged offset by at least 50° in a circumferential direction in relation to the insertion position.

10. The steering sensor device as claimed in claim 1, wherein at least one of the holding body and the toothed ring includes at least one fitting marking which, in conjunction with a feature of the other of the holding body and the toothed ring defines an orientation of the holding body and of the toothed ring relative to one another necessary for the relative movement of the holding body with respect to the toothed ring in the insertion direction to the insertion position.

11. A steering system comprising:
    a steering shaft; and
    at least one steering sensor operatively connected to the steering shaft, the at least one steering sensor including at least one sensor device, the at least one sensor device comprising:
       at least one holding body which is connected in a rotationally fixed manner to the steering shaft; and
       at least one toothed ring which has at least one toothing system configured to be used in a detection of at least one item of steering information,
       wherein the holding body and the at least one toothed ring are mechanically connected to one another by (i) relative movement of the at least one holding body with respect to the at least one toothed ring in an insertion direction to provide a prespecified overlap between the at least one holding body and the at least one toothed ring at an insertion position, followed by (ii) relative rotation of the at least one holding body with respect to the at least one toothed ring about the insertion direction.

12. A method for assembling a steering sensor device comprising:
    mechanically connecting a holding body, which is configured to connect in a rotationally fixed manner to a steering shaft, and a toothed ring, which has at least one toothing system configured to be used in a detection of at least one item of steering information, by (i) relative movement of the holding body with respect to the toothed ring in an insertion direction to provide a prespecified overlap between the holding body and the toothed ring at an insertion position, followed by (ii) relative rotation of the holding body with respect to the toothed ring about the insertion direction.

13. The steering sensor device as claimed in claim 1, wherein the at least one item of steering information is at least one steering angle.

14. The steering sensor device as claimed in claim 1, wherein the steering sensor device is a combined steering torque and steering angle sensor.

* * * * *